United States Patent [19]
Dykema et al.

[11] Patent Number: 5,348,345
[45] Date of Patent: Sep. 20, 1994

[54] VARIABLE LENGTH SHAFT ASSEMBLY

[75] Inventors: Michael A. Dykema, Birch Run; Terry E. Burkhard, Bay City, both of Mich.

[73] Assignee: General Motors Corporation, Detroit, Mich.

[21] Appl. No.: 68,519

[22] Filed: May 27, 1993

[51] Int. Cl.$^5$ .............................................. B62D 1/19
[52] U.S. Cl. ..................... 280/777; 74/492; 464/89
[58] Field of Search ............... 280/775, 777; 74/492; 464/89; 403/359

[56] References Cited
U.S. PATENT DOCUMENTS

| | | | |
|---|---|---|---|
| 3,373,629 | 3/1968 | Wight et al. | 74/492 |
| 3,457,799 | 7/1969 | Lucas et al. | 74/492 |
| 3,473,406 | 10/1969 | Runkle | 74/493 |
| 3,685,369 | 8/1972 | Adams, III | 74/492 |
| 4,337,967 | 7/1982 | Yoshida et al. | 280/777 |
| 4,509,775 | 4/1985 | Arndt | 280/779 |
| 5,228,720 | 7/1993 | Sato et al. | 280/777 |
| 5,259,818 | 11/1993 | Kachi et al. | 280/777 |

Primary Examiner—Kenneth R. Rice
Attorney, Agent, or Firm—Saul Schwartz

[57] ABSTRACT

A variable length shaft assembly including a first shaft having a tubular polygonal end, a second shaft having a correspondingly polygonal solid end telescopically disposed in the polygonal tubular end, an arched spring in a spring chamber in the solid polygonal end having a planar body portion bearing in sliding engagement on a planar wall of the polygonal tubular end and biasing the polygonal solid and tubular ends in opposite directions to a substantially zero clearance relationship in which linear clearances are reduced to substantially zero, and a monolithic plastic block injection molded in situ in the spring chamber behind the flat body portion. After the in situ injection molded plastic solidifies, the monolith plastic block captures the substantially zero clearance relationship between the polygonal solid and tubular ends and encases the arched spring such that the flat body portion thereof defines a reinforced wear plate on the block in sliding engagement on the planar wall of the tubular polygonal end.

9 Claims, 2 Drawing Sheets

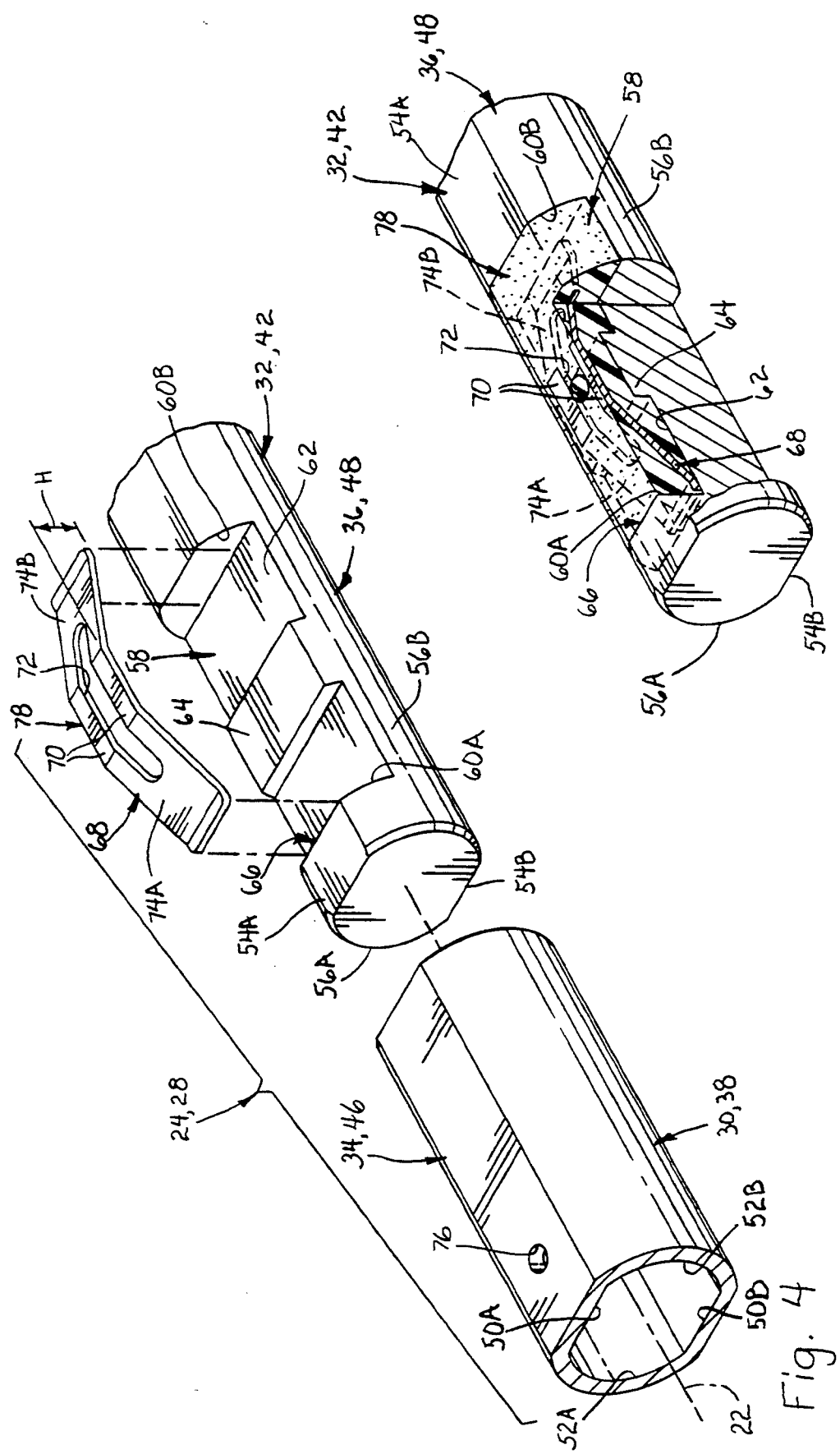

VARIABLE LENGTH SHAFT ASSEMBLY

FIELD OF THE INVENTION

This invention relates to variable length shaft assemblies in motor vehicle steering systems.

BACKGROUND OF THE INVENTION

U.S. Pat. No. 3,457,799, issued Jul. 29, 1969, describes a motor vehicle steering column having a column shaft assembly for transferring steering torque and including a first shaft having a polygonal solid end telescopically disposed in a correspondingly polygonal tubular end of a second shaft. Plastic is in situ injection molded into a clearance between the polygonal ends and into a transverse bore through the ends. When solidified, the plastic effects an angularly and linearly rigid connection between the polygonal ends which persists until the steering column experiences an energy absorbing collapse event during which the plastic in the clearance between the shaft ends defines a bearing for minimizing friction. In applications where the column shaft assembly normally experiences repeated extend/retract cycles, e.g. a length adjustable steering column, an in situ injection molded bearing such as described in the aforesaid U.S. Pat. No. 3,457,799 may be susceptible to wear and abrasion.

U.S. Pat. No. 4,509,775, issued Apr. 9, 1985 and assigned to the assignee of this invention, describes an intermediate shaft assembly for transferring steering torque between a column shaft assembly and a steering gear in a motor vehicle steering system. The intermediate shaft assembly includes a first shaft having a polygonal solid end telescopically disposed in a correspondingly polygonal tubular end of a second shaft and an arched spring in a cavity in the solid end bearing against a wall of the tubular end. The spring urges the polygonal ends in relative linear separation to a substantially zero linear clearance relationship for torque transfer without angular lash. During multiple extend/retract cycles characteristic of intermediate shaft assemblies in motor vehicle steering systems, the spring maintains the zero clearance relationship between the shaft ends while sliding back and forth relative to the wall of the tubular end.

A shaft assembly according to this invention is particularly suited for torque transfer in applications where multiple extend/retract cycles are normally experienced and is an improvement over the shaft assemblies described in the aforesaid U.S. Pat. Nos. 3,457,799 and 4,509,775.

SUMMARY OF THE INVENTION

This invention is a new and improved variable length shaft assembly for a motor vehicle steering system including a first shaft with a polygonal solid end telescopically disposed in a correspondingly polygonal end of a second shaft and with an arched spring disposed in a cavity in the solid end having a flat side bearing against a planar wall of the tubular end. In a predetermined linear position of the tubular end relative to the solid end, an orifice in the tubular end registers with a slot in the flat side of the arched spring and cooperates therewith in defining a passage through which plastic is in situ injection molded into the cavity in the solid end behind the arched spring. When solidified, the in-situ injection molded plastic defines a monolithic block around the arched spring having physical characteristics including high Young's Modulus, to capture the substantially zero linear clearance relationship between the tubular and solid ends for effectively lash-free torque transfer therebetween, and low coefficient of friction, for minimizing resistance to relative telescopic movement during multiple extend/retract cycles of the shaft assembly. The flat side of the arched spring is exposed on the side of the monolithic plastic block facing the planar wall of the tubular shaft end and defines a wear plate on the plastic block for maximizing durability.

BRIEF DESCRIPTION OF THE DRAWINGS

FIG. 4 is a fragmentary exploded perspective view of the shaft assemblies according to this invention; and FIG. 5 is a partially broken-away perspective view of a portion of FIG. 2.

DESCRIPTION PREFERRED EMBODIMENTS

Figure 1:
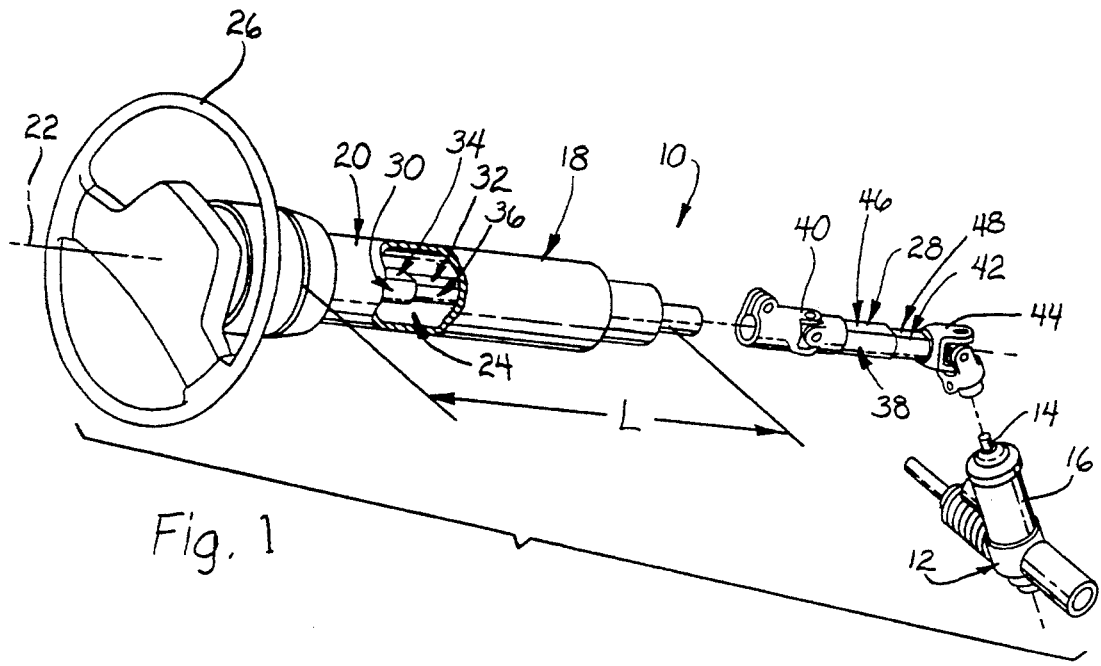
FIG. 1 is a fragmentary schematic view of a motor vehicle steering system having a column shaft assembly according to this invention and an intermediate shaft assembly according to this invention.

Referring to FIG. 1, a fragmentarily illustrated motor vehicle steering system 10 includes a representative steering gear 12 having an input shaft 14 rotatably supported on a housing 16 of the steering gear. The housing 16 is mounted on a chassis, not shown, of the motor vehicle outside of a passenger compartment thereof and contains internal rack and pinion gearing which converts rotation of the input shaft 14 to linear bodily movement of a steering rack connected in conventional fashion to steerable wheels, not shown, of the motor vehicle.

A steering column 18 of the steering system 10 includes a tubular mast jacket assembly 20 having an adjustable or variable length dimension L in the direction of a longitudinal centerline 22 of the steering column. A variable length column shaft assembly 24 according to this invention is supported on the mast jacket assembly 20 for rotation about the centerline 22. A steering wheel 26 is rigidly attached to the column shaft assembly at the top of the mast jacket assembly. Below the bottom of the mast jacket assembly outside the passenger compartment, the column shaft assembly 24 is connected to the input shaft 14 of the steering gear by a variable length intermediate shaft assembly 28 according to this invention.

The column shaft assembly 24 includes a first shaft 30 to which the steering wheel 26 is rigidly attached and a second shaft 32 to which the intermediate shaft assembly 28 is connected. The first shaft has a non-cylindrical or polygonal tubular end 34 in which is telescopically disposed a correspondingly non-cylindrical or polygonal solid end 36 of the second shaft 32. The telescopically related solid and tubular ends 34,36 transfer steering torque between the first and second shafts 30,32 while accommodating concurrent variation in the length of the column shaft assembly in accordance with changes in the length dimension L of the mast jacket assembly 20.

The intermediate shaft assembly 28 includes a first shaft 38 connected to the second shaft 32 of the column shaft assembly through a first universal joint 40 and a second shaft 42 connected to the steering gear input shaft 14 through a second universal joint 44. The first shaft 38 has a non-cylindrical or polygonal tubular end 46, identical to the tubular end 34 on the first shaft 30 of the column shaft assembly, in which is telescopically disposed a correspondingly non-cylindrical or polygonal solid end 48 of the second shaft 42, identical to the solid end 36 on the second shaft 32 of the column shaft assembly.

The telescopically related solid and tubular ends 48,46 transfer steering torque between first and second shafts 38,42 of the intermediate shaft assembly while accommodating concurrent cyclic variation in the distance separating the bottom of the column shaft assembly from the steering gear input shaft which variation results from small excursions of relative movement between the chassis and the passenger compartment of the vehicle. Also, the telescopically related solid and tubular ends 48,46 accommodate length adjustment of the intermediate shaft assembly associated with installing the latter in the motor vehicle steering system.

Figure 2:
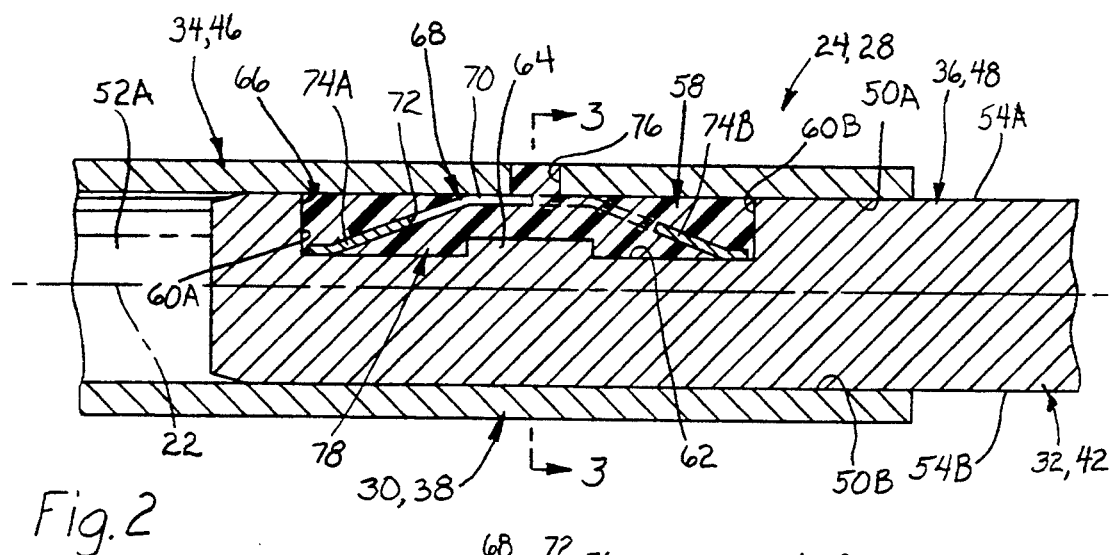
FIG. 2 is a fragmentary longitudinal sectional view of the shaft assemblies according to this invention.
Figure 3:
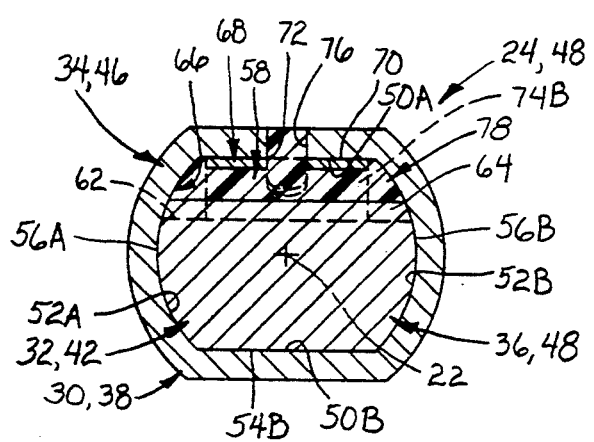
FIG. 3 is a sectional view taken generally along the plane indicated by lines 3—3 in FIG. 2.

Referring to FIGS. 2-4, the polygonal tubular ends 34,46 are defined by flattening the shafts 30,38, respectively, on opposite sides and each includes a pair of parallel planar walls 50A-B interconnected by a pair of integral arcuate walls 52A-B. The correspondingly polygonal solid ends 36,48 are defined by flattening the shafts 32,42 on opposite sides and each includes a pair of parallel planar sides 54A-B and a pair of arcuate sides 56A-B.

The solid ends 36,48 are received in the tubular ends 34,46, respectively, such that the solid and tubular ends are freely telescopically bodily shiftable relative to each other. Relative rotation between the solid and tubular ends 36,34 and 48,46 is restricted by interference between the planar walls 50A-B and the facing ones of the planar sides 54A-B. Because of linear clearances between the solid and tubular ends necessary to minimize sliding friction therebetween and because of manufacturing tolerances, the solid and tubular ends 36,34 and 48,46 are rotatable relative to each other through a small angular interval, commonly referred to as angular "lash", before interference between the planar walls and planar sides effects unitary rotation thereof. Such angular lash is usually on the order of about 1.2 degrees.

As seen best in FIGS. 2-5, the solid ends 36,48 each include a cavity 58 therein having a pair of side walls 60A-B perpendicular to the planar sides 54A-B and a bottom wall 62 parallel to the planar sides 54A-B. A transverse raised boss 64 is defined on each bottom wall 62. The cavities 58 are each open through the corresponding planar side 54A and at opposite ends through the arcuate sides 56A-B. With the solid ends 36,48 telescopically disposed in the tubular ends 34,46, respectively, the cavities 58 each define a spring chamber 66 closed on three sides by the bottom wall 62 and the side walls 60A-B and on three other sides by the planar wall 50A and the arcuate walls 52A-B of the tubular ends 34,46.

An arched spring 68 is disposed in each spring chamber 66 and includes a flat body portion 70 perforated by a slot 72 and a pair of integral curved legs 74A-B bearing against the bottom wall 62 of the corresponding cavity 58. A height dimension H, FIG. 5, of each spring 68 in an unflexed condition thereof exceeds the depth of the corresponding cavity 58 so that the flat body portion 70 of each spring is outside or outboard of the plane of the corresponding planar side 54A when the spring is unflexed, i.e. prior to introduction of the solid ends 36,48 into the tubular ends 34,46.

When the solid ends 36,48 are introduced into the tubular ends 34,46, respectively, an edge of each tubular end engages the leg 74A of the corresponding arched spring 68 and cams the flat body portion 70 into sliding engagement on the planar wall 50A of the tubular end. With the springs thus compressed or flexed, the flat body portion 70 of the springs bear in sliding engagement against the planar walls 50A of the corresponding tubular ends 34,46 and urge the telescopically related shaft ends in opposite linear directions perpendicular to the planar sides 54A-B and planar walls 50A-B. In that circumstance, linear clearances between the shaft ends 34,46 and 36,48 are reduced to substantially zero.

The tubular shaft ends 34,46 each have an orifice therein defining an injection port 76 which, in a predetermined longitudinal position of the solid shaft ends relative to the tubular shaft ends, FIGS. 2-3, registers with the slot 72 in the corresponding spring 68. While the springs 68 maintain substantially zero linear clearance between the shaft ends, in situ injection molding apparatus, not shown, injects plastic in liquid form into the spring chambers 66 behind the springs through passages defined by the injection ports 76 and the slots 72.

Other passages for introducing liquid plastic into the spring chambers 66 behind the flat body portion 70 of the springs 68 are contemplated. For example, an injection port corresponding to the injection ports 76 may be located on the opposite planar wall of the tubular ends from the injection ports 76 in the preferred embodiments. In such an alternate embodiment, flow communication between the injection port and the spring chamber is effected through a bore, not shown, in the corresponding solid end.

The liquid plastic fills each spring chamber and, upon solidification, defines a monolithic block 78 therein capturing the substantially zero clearance relationships between the shaft ends 34,46 and 36,48 as well as encapsulating the springs 68. With the ports 76 in register with the slots 72, the liquid plastic does not migrate between the flat body portions 70 of the springs and the corresponding planar walls 50A of the tubular ends so that the flat body portions 70 of the springs 68 are exposed, FIG. 5, and define reinforced wear plates on each block which minimize abrasion under multiple or continuous cycles of relative telescopic movement between the solid and tubular ends. The boss 64 on the bottom wall 62 maintains generally constant plastic thickness under the arched portions of the corresponding springs 68 to minimize the effects of shrinkage during curing.

The plastic for injection through the ports 76 is selected to exhibit predetermined physical characteristics after solidification including high Young's Modulus, for maximum torsional rigidity between the solid and tubular shaft ends, and minimum coefficient of friction, for minimum resistance to relative telescopic movement between the solid and tubular shaft ends. In a preferred embodiment, 30% glass fiber reinforced, 15% PTFE lubricated, Polyphenylene Sulfide Resin was found to exhibit acceptable physical characteristics.

After the in situ injection molded plastic solidifies, the shaft ends 34,46 and 36,48 are released for relative telescopic movement by simply fracturing the connection between the solidified plastic block 78 and the solidified plastic in the aforesaid passages defined by the registered ports 76 and slots 72. In addition, because the solid and tubular ends have substantial surface areas in sliding contact, application of conventional petroleum based lubricant between the shaft ends after in situ injection molding of the plastic blocks 78 has been found to further minimize sliding friction between the solid and tubular shaft ends.

The embodiments of the invention in which an exclusive property or privilege is claimed are defined as follows:

1. In a variable length shaft assembly including
   a first shaft,
   a second shaft,
   means defining a tubular polygonal end on said first shaft having a planar wall,
   means defining a correspondingly polygonal solid end on said second shaft disposed in said polygonal tubular end for telescopic bodily movement relative thereto and for limited rotation relative thereto through an angular interval corresponding to linear clearances between said solid polygonal end and said tubular polygonal end,
   means defining a spring chamber in said solid polygonal end having a side open to said planar wall of said tubular polygonal end, and
   a spring in said spring chamber having a flat body portion bearing in sliding engagement against said planar wall of said tubular polygonal end and biasing said solid polygonal end and said tubular polygonal end in opposite directions to a substantially zero clearance relationship in which linear clearance between said solid polygonal end and said tubular polygonal end is reduced to substantially zero,
   the combination comprising:
   means defining an injection port in said polygonal tubular end,
   means defining a passage from said injection port to said spring chamber behind said flat body portion of said spring, and
   a monolithic plastic block molded in situ in said spring chamber by introduction of liquid plastic through said passage capturing said zero linear clearance relationship between said solid polygonal end and said tubular polygonal end and defining a slide bearing therebetween and encasing said spring such that said flat body portion thereof defines a reinforced wear plate on said plastic block in sliding engagement on said planar wall of said tubular polygonal end.

2. The variable length shaft assembly recited in claim 1 wherein:
   said means defining said injection port in said polygonal tubular end includes,
   means defining an orifice in said planar wall of said polygonal tubular end, and said means defining said passage from said injection port to said spring chamber behind said flat body portion of said spring includes
   means defining a slot in said flat body portion of said spring registering with said orifice in a predetermined longitudinal position of said polygonal solid end relative to said polygonal tubular end.

3. The variable length shaft assembly recited in claim 2 wherein:
   said spring is an arched spring including a pair of integral legs at opposite ends of said flat body portion bearing against a bottom wall of said spring chamber and resiliently biasing said solid polygonal end and said tubular polygonal end in opposite linear directions perpendicular to said planar wall to said substantially zero clearance relationship.

4. In a motor vehicle steering system including a steering column having a tubular mast jacket assembly adjustable in a length direction of said steering column,
   a variable length column shaft assembly comprising:
   a first shaft rotatably supported on said mast jacket assembly,
   a second shaft rotatably supported on said mast jacket assembly,
   a steering wheel rigidly connected to one of said first and said second shafts,
   means defining a tubular polygonal end on said first shaft having a planar wall,
   means defining a correspondingly polygonal solid end on said second shaft disposed in said polygonal tubular end for telescopic bodily movement relative thereto and for limited rotation relative thereto through an angular interval corresponding to linear clearances between said solid polygonal end and said tubular polygonal end,
   means defining a spring chamber in said solid polygonal end having a side open to said planar wall of said tubular polygonal end,
   a spring in said spring chamber having a flat body portion bearing in sliding engagement against said planar wall of said tubular polygonal end and biasing said solid polygonal end and said tubular polygonal end in opposite directions to a substantially zero clearance relationship in which linear clearance between said solid polygonal end and said tubular polygonal end is reduced to substantially zero,
   means defining an injection port in said polygonal tubular end,
   means defining a passage from said injection port to said spring chamber behind said flat body portion of said spring, and
   a monolithic plastic block molded in situ in said spring chamber by introduction of liquid plastic through said passage capturing said zero linear clearance relationship between said solid polygonal end and said tubular polygonal end and defining a slide bearing therebetween and encasing said spring such that said flat body portion thereof defines a reinforced wear plate on said plastic block in sliding engagement on said planar wall of said tubular polygonal end.

5. The variable length column shaft assembly recited in claim 4 wherein:
   said means defining said injection port in said polygonal tubular end includes,
   means defining an orifice in said planar wall of said polygonal tubular end, and
   said means defining said passage from said injection port to said spring chamber behind said flat body portion of said spring includes
   means defining a slot in said flat body portion of said spring registering with said orifice in a predetermined longitudinal position of said polygonal solid end relative to said polygonal tubular end.

6. The variable length column shaft assembly recited in claim 5 wherein:
   said spring is an arched spring including a pair of integral legs at opposite ends of said flat body portion bearing against a bottom wall of said spring chamber and resiliently biasing said solid polygonal end and said tubular polygonal end in opposite linear directions perpendicular to said planar wall to said substantially zero clearance relationship.

7. In a motor vehicle steering system including
a steering gear mounted on a chassis of said vehicle having an input shaft rotatably supported on a housing of said steering gear, and
a steering shaft rotatably supported on a steering column,
a variable length intermediate shaft assembly comprising:
a first shaft,
a second shaft,
means connecting one of said first and said second shafts to said steering shaft,
means connecting the other of said first and said second shafts to said steering gear input shaft,
means defining a tubular polygonal end on said first shaft having a planar wall,
means defining a correspondingly polygonal solid end on said second shaft disposed in said polygonal tubular end for telescopic bodily movement relative thereto and for limited rotation relative thereto through an angular interval corresponding to linear clearances between said solid polygonal end and said tubular polygonal end,
means defining a spring chamber in said solid polygonal end having a side open to said planar wall of said tubular polygonal end,
a spring in said spring chamber having a flat body portion bearing in sliding engagement against said planar wall of said tubular polygonal end and biasing said solid polygonal end and said tubular polygonal end in opposite directions to a substantially zero clearance relationship in which linear clearance between said solid polygonal end and said tubular polygonal end is reduced to substantially zero,
means defining an injection port in said polygonal tubular end,
means defining a passage from said injection port to said spring chamber behind said flat body portion of said spring, and
a monolithic plastic block molded in situ in said spring chamber by introduction of liquid plastic through said passage capturing said zero linear clearance relationship between said solid polygonal end and said tubular polygonal end and defining a slide bearing therebetween and encasing said spring such that said flat body portion thereof defines a reinforced wear plate on said plastic block in sliding engagement on said planar wall of said tubular polygonal end.

8. The variable length intermediate shaft assembly recited in claim 7 wherein:
said means defining said injection port in said polygonal tubular end includes,
means defining an orifice in said planar wall of said polygonal tubular end, and said means defining said passage from said injection port to said spring chamber behind said flat body portion of said spring includes
means defining a slot in said flat body portion of said spring registering with said orifice in a predetermined longitudinal position of said polygonal solid end relative to said polygonal tubular end.

9. The variable length intermediate shaft assembly recited in claim 8 wherein:
said spring is an arched spring including a pair of integral legs at opposite ends of said flat body portion bearing against a bottom wall of said spring chamber and resiliently biasing said solid polygonal end and said tubular polygonal end in opposite linear directions perpendicular to said planar wall to said substantially zero clearance relationship.

* * * * *